Feb. 29, 1944.   J. E. SNYDER   2,342,977
PACKAGING
Filed Aug. 2, 1940

Inventor
James E. Snyder

By

Attorney

Patented Feb. 29, 1944

2,342,977

UNITED STATES PATENT OFFICE 2,342,977

PACKAGING

James E. Snyder, Akron, Ohio, assignor to Wingfoot Corporation, Wilmington, Del., a corporation of Delaware Application August 2, 1940, Serial No. 349,591

4 Claims. (Cl. 18—56)

This invention relates to a method of wrapping articles and, more particularly, to a method of forming smooth, strong, tight-fitting wrappings from thermostretchable, thermoelastic sheet materials and to the wrapped packages so formed.

By "thermostretchable, thermoelastic sheet materials" is meant those materials which, in sheet form, on warming to temperatures above ordinary or room temperatures, can readily be stretched or elongated and which, at these same temperatures or, sometimes, after cooling, release at least part of the resultant strains on removal of the imposed stresses so that they contract substantially. One of the best known of such materials is rubber hydrochloride. This is particularly adaptable to the practice of the invention and its use constitutes a preferred form of the invention. There are literature references which call rubber hydrochloride a thermoplastic material but this designation is the result of the technique previously employed, whereby the practice has been merely to mold it and set it in its deformed condition by cooling it while still under stress. If rubber hydrochloride film or sheet is warmed and stretched and the applied stresses are released shortly thereafter, the material will retract very substantially. It is this characteristic of such thermostretchable, thermoelastic materials which makes them useful in the invention. Other representative materials are unplasticized or plasticized polyvinyl chloride, chlorinated polyvinyl chloride, polyvinyl acetate, various copolymers of vinyl chloride and vinyl acetate, polyvinyl alcohol, polyvinyl acetals, polystyrene, and ethyl cellulose.

Such thin, thermostretchable, thermoelastic sheet materials have been used for wrapping and the thermostretchable properties of such materials have been particularly utilized by stretching the sheet material around the article to be wrapped so as to cause the wrap to conform to the general contour of the wrapped article. However, the prior methods of wrapping have involved certain inherent disadvantages. For example, where stretching is employed the tendency has been to produce an unequal stretching with resultant inequalities in the strains produced and in the final thickness of the film. Thus, in wrapping an irregular object like a ham by holding a heated square of rubber hydrochloride sheet by its four edges, pressing the object down into the plastic sheet and twisting off the open end of the wrapper so formed, a sheet which was originally 0.0014 inch thick will frequently contain thin spots about 0.0002 inch thick after such stretch-wrapping. These inequalities are caused in part by the fact that stretching starts at the point of initial contact between the article and the wrapping material. This locally stretched film is then of thinner gauge and less strength than unstretched portions and tends to stretch abnormally during subsequent stages of the wrapping operation. These inequalities cause serious mechanical weaknesses in the wrapper and cause localized failures, although other portions of the wrapper may be strong and entirely satisfactory. The extremely thin areas characteristic of prior methods of stretch-wrapping also degrade more rapidly from the action of light and oxidation. Also, the unequal stretching which takes place in these prior methods makes such methods unusable with printed wrappers since, with the unequal stretching, the printing is distorted so as to be unattractive or unreadable. Particularly with substantially square cornered objects such as meat loaves, loaves of bread, boxes, etc., it has been difficult to get a satisfactory tight-fitting wrap free from wrinkles by the prior methods.

By the present invention, articles and packages are wrapped in a thermostretchable, thermoelastic sheet material such as rubber hydrochloride, with attendant stretching of the sheet material, to produce a smooth, tight-fitting wrapping in which the strains are much more nearly uniform than in prior methods and in which the thickness of the film is not abnormally reduced at any point and in which printing of the sheet material may be maintained substantially in its normal, undistorted appearance, thereby producing a strong and attractive wrap.

According to the practice of the invention, a sheet or film of a thermostretchable, thermoelastic material is heated to a temperature at which it is readily stretchable and elastic and is stretched to form a flat, stretched sheet in which the thickness and strains are substantially uniform. Then, while the stretched sheet is still elastic, it is wrapped around the article to be packaged. In a particular and preferred form of the invention, the stretched sheet is wrapped around the article to form an open-ended tube, after which the ends of the tube are closed. As the result of the elasticity of the heated, stretched sheet, the wrapping conforms closely to the outline of the article and forms a tight, snug wrap. If the wrapping material is heat-sealable at the temperatures employed, the sequence of steps may be carried out with sufficient speed so that the closure of the package may be effected by contacting the opposite portions of the sheet to cause them to coalesce and thus close the package without the use of any adhesive. In practice, it is preferable for many wrapping operations to stretch the sheet along one axis, i. e., in only one direction, before wrapping the article.

The invention may be more readily understood by reference to the accompanying drawing, in which Figure 1 is a plan view showing a sheet of wrapping material clamped in a suitable piece of apparatus for carrying out the invention;

Figure 1:
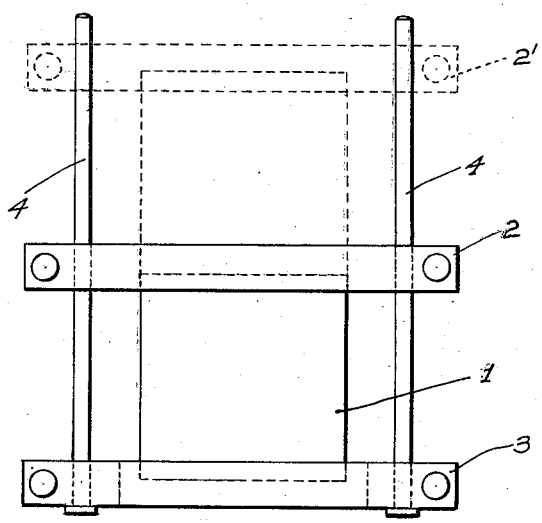
Figure 4:
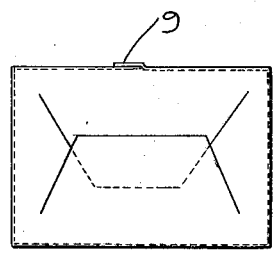
Figures 4 and 5 are end views of wrapped packages showing alternative methods of closing the ends of the packages.
Figure 2:
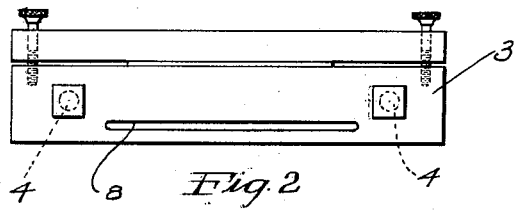
Figure 2 is an elevation corresponding to Figure 1.
Figure 5:
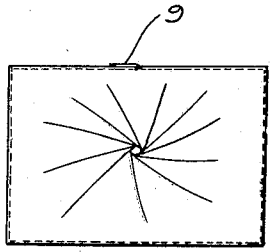
Figure 3:
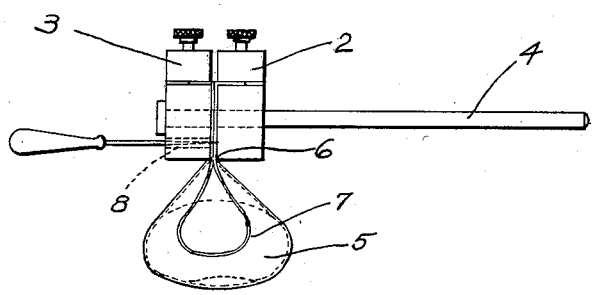
Figure 3 is an end elevation of the same apparatus showing a package of irregular cross-section in the process of wrapping.

The invention is conveniently described with particular reference to rubber hydrochloride. In one method of carrying out the invention, a thin sheet of rubber hydrochloride 1 is held by its opposite edges in clamps 2 and 3, one or both of which are slidable on rods 4. Sheets having a thickness of 0.0008 to 0.003 inch are commonly used but thinner or thicker sheets may also be used. The rubber hydrochloride is then heated to a temperature suitable for stretching the film and preferably to such a temperature that the material will heat-seal to itself. A convenient heat-sealing temperature is approximately 240° F. This may be obtained by a few seconds contact with a hot plate maintained at 300° F. Hot air or gas flame may also be used for heating the film, in which case the gas or air temperature is usually considerably higher, for example 450° F. The temperature to which the film is heated for stretching depends upon whether or not it contains plasticizer, the amount of plasticizer, etc. Clamps 2 and 3 are moved apart so as to stretch the heated film, as by moving clamp 2 to the position 2'. The article to be wrapped 5 is then placed across the film and the clamps 2 and 3 are brought together, at the same time lowering the article 5 so that the film is wrapped around the article and the opposite edge portions of the film are brought into contact as at 6. The film, already tacky by having been subjected to the heat-sealing temperature or having been brought to such temperature by heating clamps 2 and 3, will be heat-sealed along a line projected from point 6 to form an open-ended tube around the article being wrapped. At this stage of the wrapping operation, the wrap will hug the bottom and sides of the object, bridging the depressions if the article is of irregular contour, and, if desired, there may be an open space between the top of the object and the seal 6. Any excess material at the seam may be trimmed off by means of a knife inserted through slot 8. The clamps are then released. Because of the thermoelastic character of the wrapping material, the stretching sets up recoverable strains and there is a tendency for the film to contract after its release from the clamps so that the tube forms a smooth, tight-fitting wrap around the article. Since the overhanging end portions of the film are free to shrink down, the open ends will ordinarily be contracted and of somewhat irregular shape, as shown by line 7. The ends of the tube are then closed by any desired method. For example, opposite portions of the opening may be stretched toward each other and overlaid to form the conventional tucked closure shown in Fig. 4 or, alternatively, the ends may be twisted together to form the closure illustrated in Fig. 5, or the ends may be closed by gathering and tying with a string, ribbon or elastic band. Because of the shrinkage of the ends, the edge or corner portions of the end-wrap will be snug and smooth and, generally, any folds will be located toward the central portion of the end of the package, away from the edges. Also, the sheet material in the end-closures, having been free to release the recoverable strains, will be stretched to a lesser degree and under a lesser degree of strain than the portion of the sheet adjacent the end-closures. The longitudinal seam formed along the line 6 can be laid flat, as at 9, to form a smooth and attractive seam. If all of the steps outlined are performed rapidly, as they will be in commercial use, the initial heating of the rubber hydrochloride will cause the sheet to remain sufficiently tacky so that all of the sealing operations will take advantage of the heat-sealing character of the material and the wrapping operation may be carried out without reheating and without the use of any adhesive.

By this method of wrapping, the wrapping material is stretched evenly and smoothly around the package and contracts to form a tight-fitting and unusually smooth wrap. Particularly in the case of square cornered packages, the corners of the wrap are very snug and much smoother than in prior methods. The amount of stretching of the film can be regulated to meet the needs of the particular problem. Thus, if it is desired that the wrap be of maximum thickness and have a minimum of distortion, the sheet is stretched only slightly and after contraction is under relatively little strain, i. e., substantially all of the strain caused by the stretching is released. If, on the other hand, it is desired that the wrap be thin, a small piece of wrapping material is used and is subjected to a large amount of stretching.

When rubber hydrochloride and similar materials are stretched and allowed to cool and set in the stretched condition, their physical properties are markedly modified, e. g., the tensile strength is greatly increased in the direction of stretching. Particularly when it is desired to modify the properties of the wrapping in this manner, the film employed in the invention may be subjected to stretching in more than one direction. This may be done by clamping two opposite edges of a square of film and stretching it by moving the clamps apart, then clamping the free edges of the stretched film in another set of clamps, releasing the first set of clamps and stretching at right angles to the first direction of stretch by moving the second set of clamps apart. The article to be wrapped is then passed between the clamps, the stretched film is brought around the article and the clamps are brought together as previously described. Since the stretched film has a tendency to retract, it will shrink somewhat and "bow in" between the ends of the second set of clamps when the first clamps are released as described above. Therefore, it will sometimes be desirable to have the first set of clamps composed of separable sections, preferably spaced apart, and to keep these clamps attached to the film during the second stretching at right angles to the first stretching, allowing the segments of the first set of clamps to separate, as by sliding on a rod or bar, during the second stretching. The first set of clamps may then be released and the film wrapped around the article as usual. Even in this procedure, there is still some tendency for the film to retract on release of the first set of clamps. This may be minimized by placing the article to be wrapped on the film before releasing the first set of clamps. The friction between the article and the film, caused by the weight of the article, aided by a little pressure if necessary, restrains the retraction of the film where it contacts the article and the retraction is limited to the narrow edge portion of the wrapper. The film is then brought around the article as usual to form an open-ended tube, the second set of clamps is released and the ends of the tube are closed. Instead of stretching the sheet first in one direction and then at right angles, it is also possible to stretch simultaneously in a plurality of directions. Thus, a square or rectangular sheet of film may be simultaneously stretched in two directions at right angles to each other and then brought around the article to be wrapped. This stretching may be accomplished by clamping the sheet along each of its four edges by a set of separable clamps, preferably spaced apart, and drawing the opposing sets of clamps apart, allowing the units of each set to separate as the edges of the sheet are elongated. Also, a circular piece of film may be clamped around its circumference, preferably by a series of clamps spaced apart, stretched radially in all directions and then wrapped around the article. In the latter case, the package is conveniently sealed by twisting the open end of the wrapping to form a closed neck. Film so stretched simultaneously in a plurality of directions has less tendency to develop a "grain" due to alignment of the molecules along an axis or, in other words, the molecules in such a stretched sheet are arranged in random manner in the plane of the sheet instead of tending to be oriented in one direction.

Since chilling the stretched rubber hydrochloride sheet under tension tends to set it in its stretched condition, the amount of retraction may be controlled within limits by cooling the stretched sheet before wrapping it around the article. If desired, this cooling may be directed against only certain portions of the sheet.

The process of the invention is particularly adaptable to the packaging of articles of irregular shape, for example having been used experimentally with a high degree of success in the packaging of hams to form a smooth, strong, attractive package. The method is particularly adaptable to the wrapping of objects having a long axis. It may also be used with cylinders and other articles of regular geometrical shape, including those having flat sides and relatively sharp corners such as right-angled hexahedrons, polyhedrons of octagonal cross-section and the like. When the article has a long axis, the open-ended tube is preferably formed by wrapping the sheet around the long axis of the article.

Although the invention has been particularly described in connection with the use of heat sealing, it is obviously also possible to employ adhesives, solvent seals and other closure methods.

Various types of rubber hydrochloride film may be employed in the practice of the invention. Thus, the film may or may not contain various compounding ingredients, such as plasticizers, photochemical inhibitors, heat stabilizers, dyes, pigments, waxes, resins, etc. Also, the film may be coated with waxes, resins and various other materials. Such coatings may be applied to increase moisture-resistance, to modify the appearance of the film, to protect the film against attack by specific chemicals or solvents or the action of light, to inhibit the formation of molds, or for any other purpose. If it is desired that the original thickness of the film be more than about 0.0025 inch, it is convenient to use sheets laminated by heat or adhesives. If desired, the sheets may be pre-stretched before use in the wrapping process. Various other modifications will also suggest themselves.

Although certain embodiments of the invention have been described in detail, it will be apparent to those skilled in the art that various modifications may be made therein without departing from the spirit of the invention or the scope of the appended claims.

I claim:

1. The method of wrapping an article with a thermo-stretchable, thermoelastic sheet which comprises heating the sheet until it is stretchable and elastic, stretching it in at least one direction, and then, while the sheet is still elastic and while maintaining the sheet under stretching tension, wrapping the sheet around the article so that the sheet encircles the article in a direction of stretch, and then uniting opposite ends of said sheet along a line substantially perpendicular to said direction of stretch while the sheet is still maintained under stretching tension and while it is elastic, and allowing it to shrink to at least in part conform to the shape of the article.

2. The method of wrapping an article with a thermo-stretchable, thermoelastic and heat-sealable sheet which comprises heating the sheet to a temperature at which it is stretchable, elastic and heat-sealable and stretching it in one direction while so heated and then, while the sheet is still elastic, wrapping the stretched sheet around the article so that said direction of stretch encircles the article, and then uniting opposite ends of the sheet along a line substantially perpendicular to said direction of stretch by forming a heat-seal therealong, closing the opposite ends of the package by a heat-seal and permitting the film while still elastic to shrink to at least in part conform to the shape of the article.

3. The method of wrapping an article with a thermo-stretchable, thermoelastic sheet which comprises heating the sheet to make it stretchable and elastic, stretching the sheet in one direction, then enclosing an article to be wrapped by placing the stretched, elastic sheet around the article and uniting opposite ends of the sheet to form a circumferentially stretched tube, and then closing the ends of the tube and allowing the tube to shrink to at least in part conform to the shape of the article.

4. The method of wrapping an article in a thermo-stretchable, thermoelastic sheet which comprises heating the sheet until it becomes stretchable and elastic and stretching it in at least one direction and then, while it is still stretchable and elastic and while maintaining it under stretching tension, wrapping the sheet around the article so that the sheet encircles the article in a direction of stretch, and then sealing together portions of said sheet while the sheet is still maintained under stretching tension and while it is elastic, and allowing it to shrink to at least in part conform to the shape of the article.

JAMES E. SNYDER.